US008612632B2

(12) United States Patent  
Day et al.

(10) Patent No.: US 8,612,632 B2  
(45) Date of Patent: Dec. 17, 2013

(54) SYSTEMS AND METHODS FOR TAG INFORMATION VALIDATION IN WIDE PORT SAS CONNECTIONS

(75) Inventors: Brian A. Day, Colorado Springs, CO (US); Srikiran Dravida, Norcross, GA (US); Parameshwar Ananth Kadekodi, Norcross, GA (US)

(73) Assignee: LSI Corporation, Milpitas, CA (US)

( * ) Notice: Subject to any disclaimer, the term of this patent is extended or adjusted under 35 U.S.C. 154(b) by 2387 days.

(21) Appl. No.: 10/921,018

(22) Filed: Aug. 18, 2004

(65) Prior Publication Data

US 2006/0039406 A1 Feb. 23, 2006

(51) Int. Cl.  
*G06F 13/14* (2006.01)

(52) U.S. Cl.  
USPC ................................. 710/5; 710/62

(58) Field of Classification Search  
None  
See application file for complete search history.

(56) References Cited

U.S. PATENT DOCUMENTS

| | | | |
|---|---|---|---|
| 6,098,109 A | 8/2000 | Kotzur et al. | |
| 6,134,630 A | 10/2000 | McDonald et al. | |
| 6,493,750 B1 | 12/2002 | Mathew et al. | |
| 6,965,956 B1 | 11/2005 | Herz et al. | |
| 7,028,106 B2 | 4/2006 | Foster et al. | |
| 7,035,952 B2 | 4/2006 | Elliott et al. | |
| 7,155,546 B2 | 12/2006 | Seto | |
| 7,171,500 B2 | 1/2007 | Day et al. | |
| 7,334,042 B2 | 2/2008 | Day et al. | |
| 7,376,147 B2 | 5/2008 | Seto et al. | |
| 7,415,723 B2 | 8/2008 | Pandya | |
| 7,502,865 B2* | 3/2009 | Seto | 709/238 |
| 2002/0184417 A1 | 12/2002 | Lin | |
| 2003/0172335 A1* | 9/2003 | Das Sharma | 714/746 |
| 2004/0205259 A1* | 10/2004 | Galloway | 710/3 |
| 2005/0080881 A1 | 4/2005 | Voorhees | |
| 2005/0125574 A1 | 6/2005 | Foster et al. | |
| 2005/0138154 A1 | 6/2005 | Seto | |
| 2005/0185599 A1 | 8/2005 | Clayton | |
| 2005/0235072 A1 | 10/2005 | Smith | |
| 2006/0015654 A1* | 1/2006 | Krantz et al. | 710/5 |
| 2006/0015774 A1* | 1/2006 | Nguyen et al. | 714/18 |
| 2006/0039405 A1 | 2/2006 | Day et al. | |
| 2006/0039406 A1 | 2/2006 | Day et al. | |
| 2006/0041672 A1 | 2/2006 | Day et al. | |

OTHER PUBLICATIONS

"Introduction to Serial Attached SCSI," Mark Evans, Maxtor, May 23, 2003.

* cited by examiner

*Primary Examiner* — Ilwoo Park  
(74) *Attorney, Agent, or Firm* — Duft Bornsen & Fettig, LLP; Gregory T. Fettig

(57) ABSTRACT

Methods and structures for validating tag information received in SAS frames by any of a plurality of ports comprising a SAS wide port. Each port may have a dedicated transport layer processing element. A tag information table is shared by all of the one or more transport layer processing elements. The tag information table is used to store information regarding a particular tag value being valid for use with a particular device and is updated when the particular tag value is no longer valid for use with the particular device. The information is initially stored in response to transmission of a frame that first uses the particular tag value with the particular device. The tag information table is updated to indicate the particular tag value is no longer valid upon receipt of an appropriate SAS frame or by a processing element external to the one or more transport layer processing elements.

14 Claims, 3 Drawing Sheets

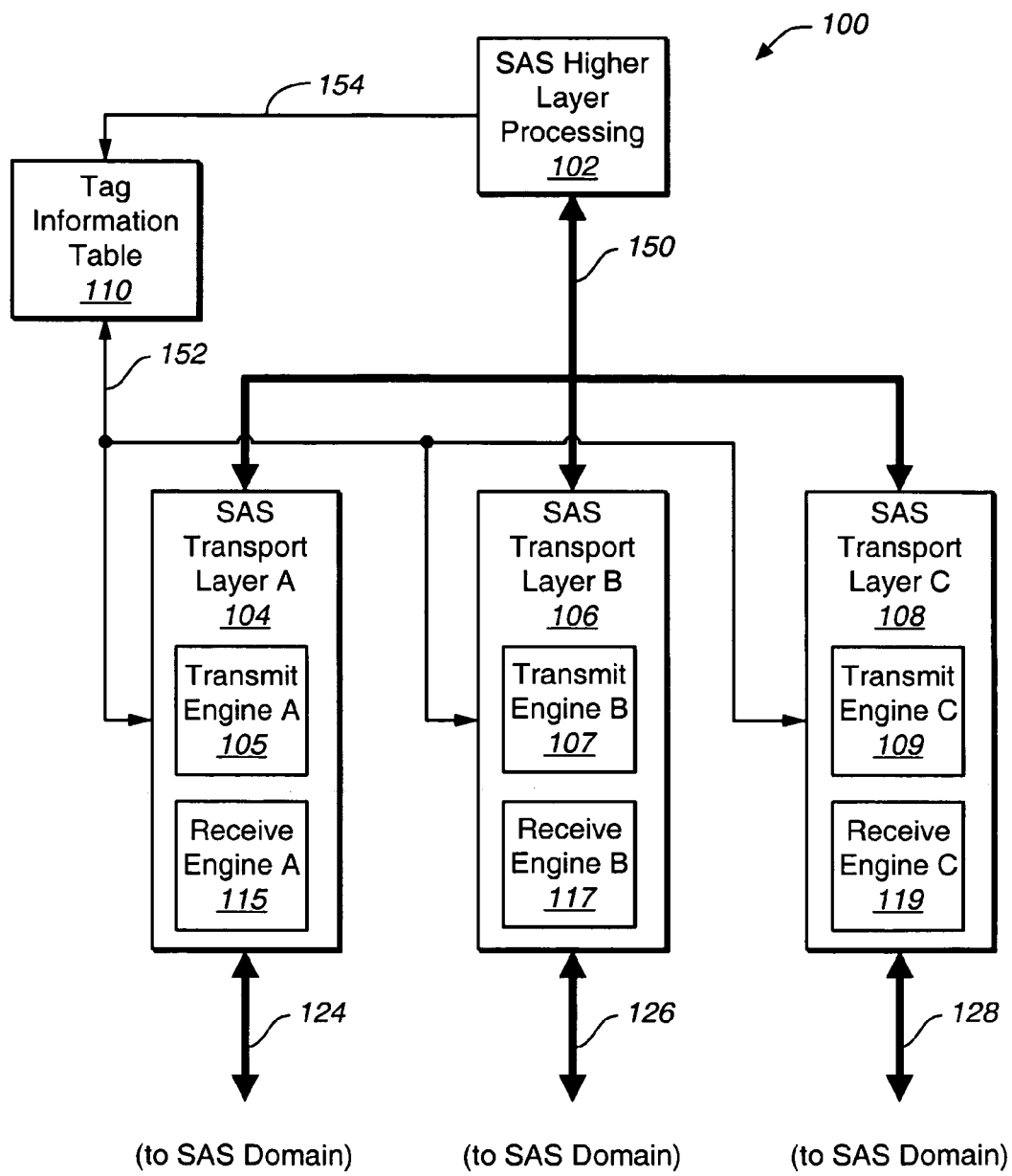
FIG._1

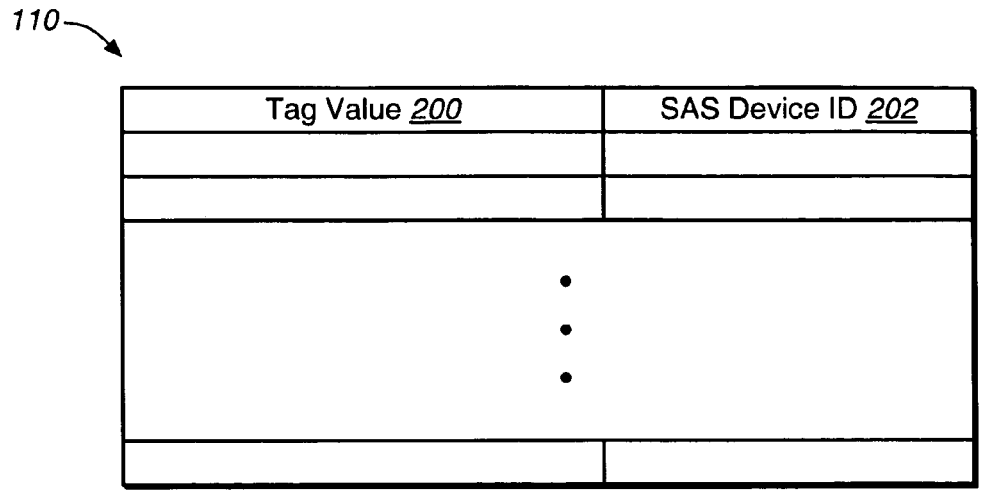
FIG._2
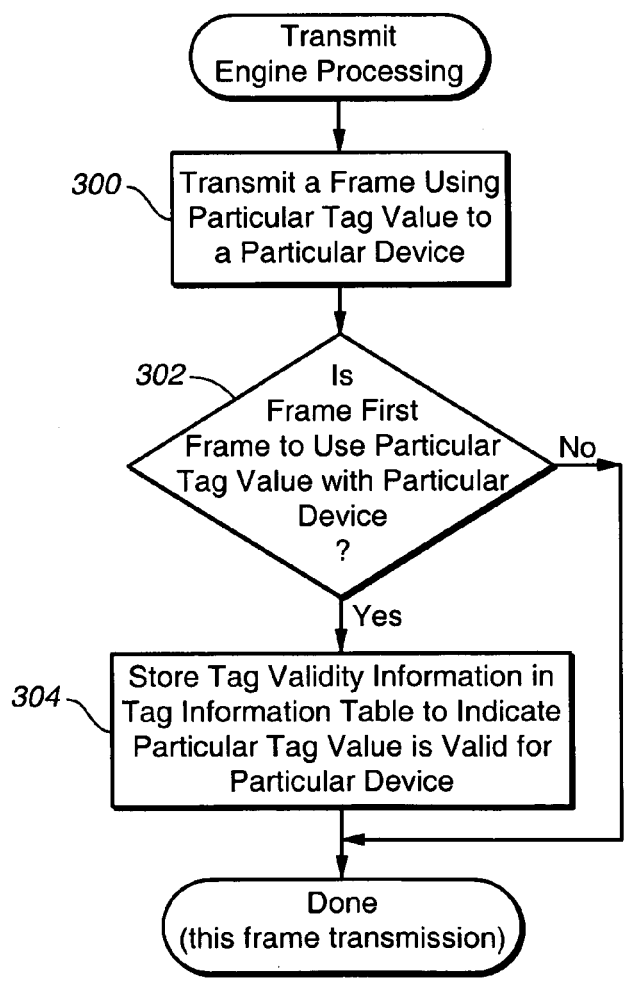
FIG._3

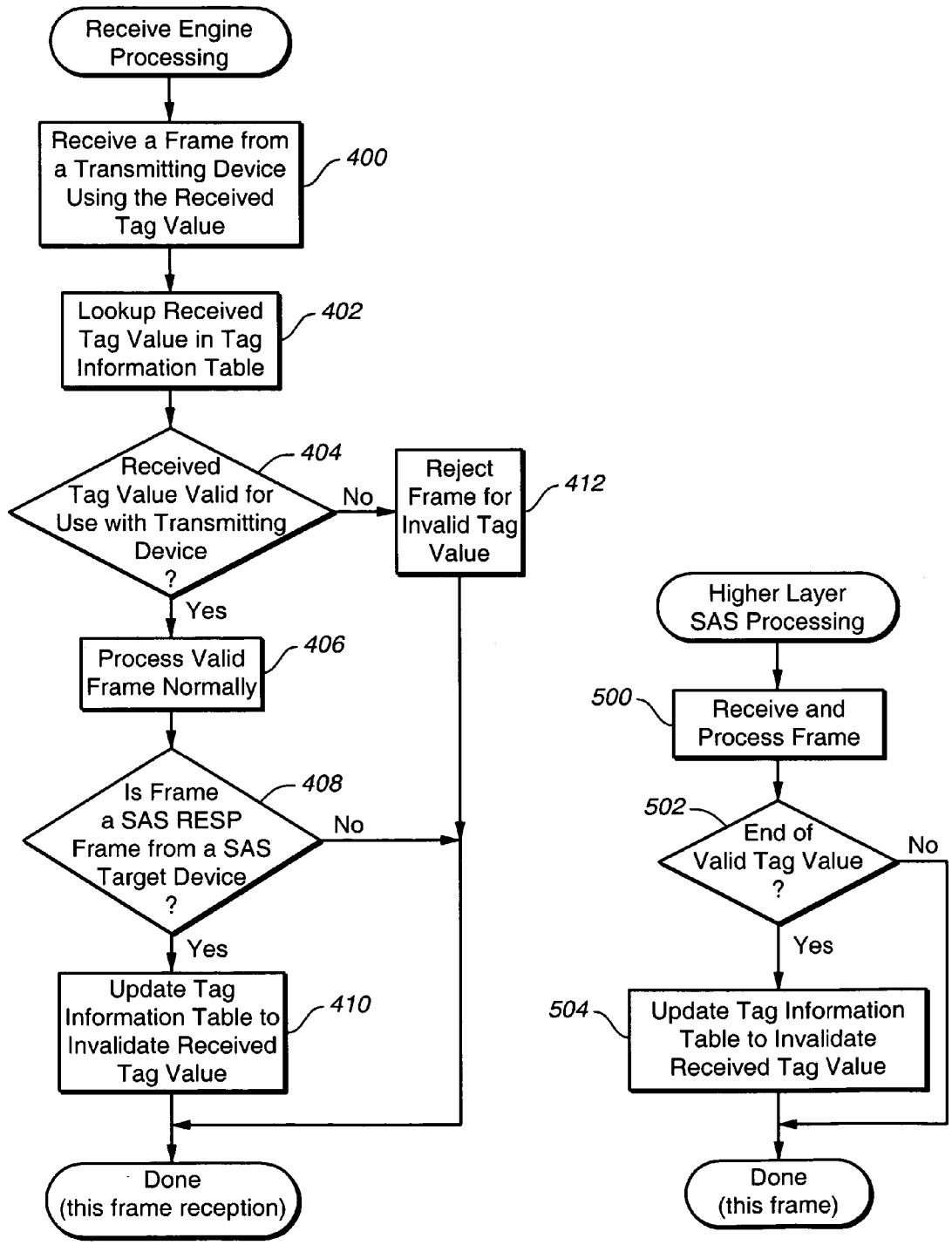
FIG._4
FIG._5

SYSTEMS AND METHODS FOR TAG INFORMATION VALIDATION IN WIDE PORT SAS CONNECTIONS

BACKGROUND OF THE INVENTION

1. Field of the Invention

The invention generally relates to management of SAS wide ports. More specifically, the invention relates to methods and structures for efficiently validating transfer tags in the transport layer processing of a SAS controller.

2. Related Patents

This patent is related to co-pending, commonly owned U.S. patent application Ser. No. 10/920,984 filed on Aug. 18, 2004 and entitled SYSTEMS AND METHODS FOR FRAME ORDERING IN WIDE PORT SAS CONNECTIONS which is hereby incorporated by reference.

3. Discussion of Related Art

Small Computer Systems Interface ("SCSI") is a set of American National Standards Institute ("ANSI") standard electronic interface specifications that allow, for example, computers to communicate with peripheral hardware. Common SCSI compatible peripheral devices may include: disk drives, tape drives, Compact Disc-Read Only Memory ("CD-ROM") drives, CD Read/Write ("CD-RW"), digital versatile disk ("DVD") drives, printers, scanners, etc. SCSI as originally created included both a command/response data structure specification and an interface and protocol standard for a parallel bus structure for attachment of devices. SCSI has evolved from exclusively parallel interfaces to include both parallel and serial interfaces. "SCSI" is now generally understood as referring either to the communication transport media (parallel bus structures and various serial transports) or to a plurality of primary commands common to most devices and command sets to meet the needs of specific device types as well as a variety of interface standards and protocols.

The collection of primary commands and other command sets may be used with SCSI parallel interfaces as well as with serial interfaces. Examples of serial interface transport media and protocol standards that support SCSI command processing include: Fibre Channel, Serial Bus Protocol (used with the Institute of Electrical and Electronics Engineers 1394 FireWire physical protocol; "IEEE 1394") and the Serial Storage Protocol (SSP).

SCSI interface transports and commands are also used to interconnect networks of storage devices with processing devices. For example, serial SCSI transport media and protocols such as Serial Attached SCSI ("SAS") and Serial Advanced Technology Attachment ("SATA") may be used in such networks. These applications are often referred to as storage networks. Those skilled in the art are familiar with SAS and SATA standards as well as other SCSI related specifications and standards. Information about such interfaces, media, protocols and commands is generally obtainable at the website http://www.t10.org.

Such SCSI storage networks are often used in large storage systems having a plurality of disk drives to store data for organizations and/or businesses. The network architecture allows storage devices to be physically dispersed in an enterprise while continuing to directly support SCSI commands directly. This architecture allows for distribution of the storage components in an enterprise without the need for added overhead in converting storage requests from SCSI commands into other network commands and then back into lower level SCSI storage related commands.

A SAS network typically comprises one or more SAS initiators coupled to one or more SAS targets via one or more SAS expander devices. In general, as is common in all SCSI communications, SAS initiators initiate communications with SAS targets. In particular, SAS initiators use a process often referred to as "discovery" to determine the topology of devices in the network (i.e., to discover other SAS initiators, SAS expanders and SAS targets). Once such information is known, initiators generally establish the first contacts with a given target device. The initiator issues an "open" request (i.e., a SAS OPEN address frame) to an identified SAS target to establish a first connection with the SAS target device. Once the first connection is so established, either the SAS initiator or the SAS target device may re-establish a connection. For example, a connection may be established initially by the initiator, closed after some transactions are exchanged, and then re-opened by the same initiator for a subsequent sequence of transactions. Or, for example, a SAS target device may have deferred processing of a transaction received from an initiator. At some later time when the SAS target is ready to proceed, the target device may "open" a connection back to the initiator that originally requested the deferred transaction.

In SAS protocol command exchanges, a SAS initiator device sends a command and associated data to a particular identified SAS target device. The command and data exchanged may be voluminous but the SAS specifications limit each frame to approximately 1 kilobyte. Thus a larger exchange must be broken into smaller frames and distributed over a number of frames. Further, since the SAS specifications permit multiple commands/data to be exchanged concurrently, each SAS command is identified with a set of field values that, collectively, uniquely identify the I/O being processed to which a sequence of exchanged frames are related. For example, in a SCSI application, the combination of an initiator device ID, a target device ID, a logical unit number ("LUN") and a tag value (assigned by the initiator) is assured to uniquely identify a sequence of related frames all related to a particular I/O operation. As a matter of design choice, in a particular application, a unique TAG field value (or using the Target Port Transfer Tag ("TPTT") field value) may provide a sufficiently unique ID to identify all frames related to a particular I/O request. Collectively the TAG and TPTT field values may be referred to herein as tag fields (or "transfer tags" or "tag values"). The specification for contents of these tag fields and their use in SAS transport layer processing are well known to those of ordinary skill in the art and are documented in the SAS specifications. In general, these tag values are provided in the headers of each transmitted/received frame so that the receiver may determine which command a received frame is associated with.

SAS specifications also allow for a wide port—a logical port comprising a plurality of ports aggregated to operate as one logical port. SAS specifications restrict use of the wide port such that at any given point in time, frames for a particular command may be transferred over only one of the multiple ports that make up the wide port at a time. Once one frame is completely transmitted (and acknowledged by the receiver), another frame may be received on the same port or another of the multiple ports of the wide port.

The SAS specifications for the transport layer processing calls for validation of frames to include validation of the tag fields exchanged in frames between an initiator and a target device. It is common in SAS controller implementations that the transport layer processing is performed by a single transport layer processing element —i.e., a general or special purpose processor programmed with software/firmware (programmed instructions) to perform the transport layer processing according to SAS specifications. Such a software/firmware implementation of a transport layer may also perform transport layer processing for a SAS wide port by coordinating with the multiple link layer processing elements for the ports that make up the wide port. Such a software/firmware implementation of a transport layer integrates the management of the multiple physical ports and their communication in the single transport layer processing element.

Where particular SAS controller embodiments separate the transport layer processing such that each physical/link layer is associated with a distinct transport layer processing element, such coordination for tag validation in wide ports is problematic. For example, some embodiments of SAS controller provide customized integrated circuits—one per link/transport pair—for controlling physical/link layer processing and for controlling transport layer processing in accordance with the SAS specifications. In such an embodiment, each transport layer is associated with a corresponding link/physical layer to define the processing of a single port. In a wide port application, the multiple custom circuits that control each of the multiple ports of the wide port would have to cooperate to effectively validate tags as required of the transport layer in the SAS specifications. For example, a first port of the multiple ports that comprise the wide port may receive the initial frame that defines the valid tag for a sequence of related, tagged frames. The other ports would potentially receive subsequent frames but without the knowledge of the valid tag defined by the first frame of the sequence. This level of coordination presents a problem for managing transport layer tag validation in SAS wide port applications.

In view of the above discussion, it is evident that there is an ongoing need for improved systems and methods for transport layer tag validation in the processing of SAS frames received over multiple physical ports of a SAS wide port.

SUMMARY OF THE INVENTION

The present invention solves the above and other problems, thereby advancing the state of useful arts, by providing methods and associated structures for efficiently validating tag values provided in frames received over multiple ports of a SAS wide port where each port is associated with a distinct transport layer processing element. A tag validity information table is generated, maintained and queried by cooperative processing of the multiple transport layer processing elements. The table resides in a memory shared by all transport layer processing elements. The table generally includes information indicating when a particular tag value is valid and, if valid, for which particular associated SAS device. The invention may be scaled for use with any number of ports including a single, independent port (i.e., not a wide port).

A first feature hereof therefore provides a SAS controller adapted for performing SAS protocol transport layer processing, the controller comprising: at least one transport layer processing element each adapted for performing SAS transport layer processing for a corresponding port of the SAS controller; a tag information table for storing tag values and associated device identification information; and a communication medium coupling all the at least one transport layer processing elements to the tag information table such that each processing element may share access to the tag information table, wherein each transport layer processing element is adapted to validate tag information in frames using the information in the tag information table.

Another aspect hereof further provides that each transport layer processing element further comprises: a transmit frame engine for managing transmission of frames to other devices; and a receive frame engine for managing reception of frames from other devices.

Another aspect hereof further provides that the transmit frame engine is adapted to make a particular tag value valid by storing information in the tag information table indicating the particular tag value is valid for use with a particular device wherein the transmit frame engine is so operable in response to transmission of a frame to the particular device using the particular tag value, and further provides that the receive frame engine is adapted to verify validity of a received tag value by looking up the received tag value in the tag information table, wherein the received tag value is provided in a received frame from a transmitting device.

Another aspect hereof further provides that the transmit frame engine is further adapted to make the particular tag value valid by storing information in response to transmission of a SAS COMMAND frame transmitted as a SAS initiator device.

Another aspect hereof further provides that the transmit frame engine is further adapted to make the particular tag value valid by storing information in response to transmission of a SAS XFER_RDY frame transmitted as a SAS target device.

Another aspect hereof further provides that the receive frame engine is adapted to make invalid a particular tag value indicated as valid in the tag information table by updating information in the tag information table.

Another aspect hereof further provides that the receive frame engine is further adapted to make the particular tag value invalid in response to receipt of a SAS RESP frame received in any of the at least one transport layer processing elements operating as a SAS initiator device.

Another aspect hereof further provides an auxiliary processing element external to the transport layer processing elements and associated with the transport layer processing elements and adapted to make a particular tag value invalid.

A second feature hereof provides a method operable in a SAS controller having at least one transport layer processing element, the method comprising: transmitting a SAS frame with a particular tag value from a transmitting one of the at least one transport layer processing elements to a particular SAS device; storing tag validity information in a tag information table shared by all of the at least one transport layer processing elements, wherein the tag validity information indicates that the particular tag value is valid for frames associated with the particular SAS device; and validating the received tag value associated with any frames received in any of the at least one transport layer processing elements by looking up the received tag value in the tag information table to determine whether the received tag value is valid.

Another aspect hereof further provides that the step of transmitting further comprises: transmitting a SAS COMMAND frame as an initiator SAS device.

Another aspect hereof further provides that the step of transmitting further comprises: transmitting a SAS XFER_RDY frame as a target SAS device.

Another aspect hereof further provides for updating the tag information table to indicate that a particular tag value previously indicated as valid is now invalid.

Another aspect hereof further provides that the step of updating further comprises: updating the tag information table in response to receipt of a SAS RESP frame in any of the at least one transport layer processing element operating as a SAS initiator device.

Another aspect hereof further provides that the step of updating further comprises: updating the tag information table from a processor external to all of the at least one transport layer processing elements in response to a determination that the particular tag value is no longer valid for the particular device.

BRIEF DESCRIPTION OF THE DRAWINGS

FIG. 1 is a block diagram of a SAS controller enhanced in accordance with features and aspects hereof to efficiently validate tag information in SAS frames in a plurality of cooperating transport layer processing elements.

FIG. 2 is a block diagram representing an exemplary structure for a tag information table structure as may be used in FIG. 1 in accordance with features and aspects hereof.

FIG. 3 is a flowchart describing methods operable in accordance with features and aspects hereof to efficiently validate tag information in transmission of SAS frames.

FIG. 4 is a flowchart describing methods operable in accordance with features and aspects hereof to efficiently validate tag information in reception of SAS frames.

FIG. 5 is a flowchart describing methods operable in accordance with features and aspects hereof in a higher level SAS protocol processing element to indicate that a properly received tag value is no longer valid for use by a particular device.

DETAILED DESCRIPTION OF THE DRAWINGS

FIG. 1 is a block diagram of a SAS controller 100 enhanced in accordance with features and aspects hereof. SAS controller 100 may include a plurality of SAS transport layer processing elements 104, 106 and 108 all coupled via path 150 to higher layers of the SAS protocol management (i.e., application and system processes, etc.). Each transport layer processing element may include a transmit engine and a receive engine for transmitting and receiving frames respectively. The transmission and reception engines may interact with lower layers (not shown) of the SAS protocol stack such as link/physical layer processing elements to actually perform desired encoding and modulation of signals applied to communication media and the SAS domain. In particular, for example, transport layer processing element may include transmit engine 105 and receive engine 115, transmit layer processing element 106 may include transmit engine 107 and receive engine 117, and transport layer processing element 108 may include transmit engine 109 and receive engine 119. Each transport layer processing element 104, 106 and 108 may then be coupled to the SAS domain via corresponding communication paths 124, 126 and 128, respectively.

As noted above, in prior techniques and structures, all transport layer processing may have been integrated within a single processing element—typically a programmable device suitably programmed with instructions to perform desired SAS transport layer processing. As noted above, some present implementations utilize separate processing elements (i.e., customized circuits) for each transport layer processing element. The custom, separate circuits may enhance performance to provide desired bandwidth improvements and other benefits as compared to the prior approach. With a single, integrated transport layer processing element, management of tag information in SAS frames is simpler in that a single, integrated transport layer processor can manage all tag related information for all ports of a SAS wide port application. Such tag validation and management is more complex where each transport layer processing element is a separate component associated with one port of the multiple ports of the SAS wide port application. In such a configuration, the multiple transport layer processing elements must be able to efficiently share information regarding valid and invalid tags so that all ports of a SAS wide port may properly validate use of tag information.

As shown in FIG. 1 and in accordance with features and aspects hereof, multiple transport layer processing elements may share access to a tag information table 110 in which tag validity information is maintained and shared by the transport layer processing elements 104, 106 and 108. Table 110 may be stored in any suitable memory device such as a random access memory (RAM including SDRAM and non-volatile RAM devices). In one exemplary embodiment of such a table memory, a content addressable memory ("CAM") may be used to return device ID information in response to application of a received tag value (or vice versa). Any of several well known memory device structures may store the tag information for later retrieval and comparison. Suitable arbitration circuits and/or techniques (not shown) may be utilized to assure proper mutual exclusion in the potentially concurrent access to the shared memory table 110 by transport layer processing element 104, 106 and 108.

In general, the transmit engine element of a transport layer processing elements stores information in the tag information table 110 upon commencing a new sequence of frame transmissions all associated with a particular tag value and destined to a particular SAS device. As related frames in an exchange are returned from the particular device (data and other response frames), the receive engine of the transport layer accesses the tag information table 110 to validate that the received tag value in the received frame is properly used by the SAS device transmitting the received frame. In other words, the tag value in a received frame is valid if the tag information table 110 indicates that the tag value is valid for the same device that transmitted the just received frame. Further, in an SAS device operating as an initiator, eventual reception of a SAS RESP frame signals the end of use of the associated tag value with respect to the transmitting target device. In such a case, the transport layer processing element may update the tag information table to indicate that the received tag value is no longer valid for use with the associated device. Where the SAS controller is operable as a target device, it may not be as simple for the receive engine of the transport layer processor to recognize when the tag value is no longer valid for use. Transmissions using the valid tag value may not reveal apriori the intended total length of the expected transmission. In such a case, a processing element (i.e., 102) external to the transport layer processing elements (104, 106 and 108) may need to determine when a tag is no longer valid based on higher level processing. SAS higher layer processing element 102 may provide such a service to the transport layer processing elements 104, 106 and 108.

The configuration of FIG. 1 is intended merely as exemplary of one possible configuration of ports aggregated for use as a SAS wide port. Those skilled in the art will recognize that the specific configuration may be modified to provide any number of transport layer processing elements in accordance with the needs of a particular application. Further, the transmit and receive engines are shown in FIG. 1 as integrated within each corresponding transport layer processing element but may also be separated as other processing elements such as link layer processing elements. Further, the link layer processing element (not shown) may be integrated within the same processing element as the transport layer processing element to provide all link layer processing for a port tightly coupled with the transport layer processing for the same port.

These and other design choices for implementing features and aspects hereof will be readily apparent to those of ordinary skill in the art.

FIG. 2 shows an exemplary structure for tag information table 110 a FIG. 1. As noted above, the tag information table 110 preferably associates a particular tag value with a particular SAS device. Each row of the tag information table 110 may therefore include a pair of values associating a particular tag value 200 with a corresponding SAS device 202 (i.e., a SAS device address or other device ID). Once such a value pair is entered in the table 110, its presence in the table indicates that the tag value 200 is presently valid for use in exchanges relating to SAS device 202. When a tag value is no longer valid according to SAS protocol specifications, the entry indicating a valid tag value and the corresponding SAS device ID may be eliminated from the table.

Alternatively, an additional flag field (not shown) may be used to set and reset a valid flag indicating that the corresponding tag value 200 and SAS device ID 202 pair is presently valid or invalid. Those of ordinary skill in the art will readily recognize numerous equivalent structures for storing information indicating a presently valid or invalid combination of a tag value 200 a corresponding SAS device ID 202.

Further, as noted above, tag information table 110 may be stored in any suitable random access memory device including, for example, SDRAM and non-volatile RAM devices. In one particular exemplary embodiment, a content addressable memory (CAM) device may be utilized such that values may be stored and indexed by one of the pair of associated values and subsequently located by application of the indexed value to the content of addressable memory. These and other suitable indexing, hashing, and table look up techniques and structures will be readily apparent to those of ordinary skill in the art.

FIGS. 3 and 4 are flowcharts describing methods of operation within a transport layer processing element in accordance with features and aspects hereof to substantially automate tag validity checking for received tags in received SAS frames. As noted above, each transport layer processing element may be associated with a transmit frame engine processing element and a receive frame engine processing element. Such transmit and receive engine elements may be integrated within the transport layer processing element or may be external to the transport layer processing element and communicatively coupled thereto. Further, the transmit and receive frame engine elements may be an integral aspect of a link layer processing element associated with and coupled to each transport layer processing element of the SAS controller. FIG. 3 represents processing of the transmit engine to transmit SAS frames from the SAS controller to another SAS device and to record the validity information regarding a newly utilized tag value in the tag information table. FIG. 4 is a flowchart describing cooperative processing within the receive engine element to receive frames transmitted by another SAS device and to validate the received tag value using tag validity information in the tag information table. Further, when the transport layer is operating as a SAS initiator device, the receive engine processing element may also automatically detect when a particular tag value is no longer valid and may therefore automatically update the tag information table accordingly.

Referring first to FIG. 3, the transmit engine processing element associated with the transport layer processing element is first operable at element 300 to transmit a provided SAS frame using a provided particular tag value. The transmitted frame uses a tag value supplied by supplied to the transport layer processing element by higher level SAS protocol processing elements. Further, the particular device to which the frame is to be transmitted is indicated by the higher level SAS protocol processing elements. Element 302 next determines whether this transmitted frame is the first frame to use the particular supplied tag value in transmissions to the particular identified device. If not, transmit engine processing for this frame transmission is completed to be restarted when a next frame transmission is requested by a higher level SAS protocol processing element. In other words, if the presently transmitted frame is other than the first frame to transmit with a particular tag value, no further tag related processing need to be performed by the transmit engine associated with this transport layer processing element. However, if element of 302 determines that the presently transmitting frame is the first frame to use the particular supplied tag value in a frame destined for the particular identified SAS device, element 304 is operable to store tag validity information in the tag information table to indicate that the particular supplied tag value is now valid for use with the particular identified device. As noted above, the information so stored may include a new row in the tag information table associating the supplied particular tag value with the supplied particular device ID. Further, as noted above, other table structures may permit setting or resetting of a flag indicating that a combination previously stored in a row of the tag information table is again valid for use with the particular identified device. Any appropriate means or technique for storing information in the tag information table that indicates that the particular tag value is now valid for use with the particular device ID may be performed by the processing of element 304.

More specifically, when the transport layer processing element is operable as an initiator device in the SAS protocol, transmission of a SAS COMMAND frame is indicative of the first frame to utilize the particular supplied tag value. When the SAS transport layer processing element transmit engine is operating as a SAS target device, transmission of a SAS XFER_RDY frame is indicative of a first frame transmitting with the particular supplied tag value and destined for the particular identified SAS device. Those of ordinary skill in the art will recognize other equivalent techniques and indicia for determining which transmitted frame is the first frame in a sequence of related transmitted frames to utilize the particular supplied tag value in transmissions destined to the particular identified SAS device. Such other techniques and means may include, for example, out of band signaling techniques between higher level SAS protocol processing elements and the transport layer processing element. Further, other designs may include out of band annotations associated with the frame data exchanged between the higher level SAS processing elements, the transport layer processing element and the transmit engine associated with the transport layer processing element. Those of ordinary skill in the art will recognize a wide variety of similar techniques and structures for determining or detecting when a particular frame transmission is the first frame transmission in a sequence to utilize a particular supplied tag value in frames destined for a particular identified SAS device.

FIG. 4 is a flowchart describing related cooperative processing within the receive engine of a transport layer processing element of the SAS controller enhanced in accordance with features and aspects hereof. In general, a receive engine is associated with each transport layer processing element of a SAS controller in accordance with features and aspects hereof and verifies that the received tag value in a received frame from a transmitting SAS device is known to be valid for use with that device. The receive engine therefore looks up the received tag value in the tag information table and, if an appropriate record is located, verifies that the tag value is being used with the particular SAS device with which is appropriately associated in the table. This table look up procedure may be performed within each of potentially multiple transport layer processing elements of an enhanced SAS controller as each receives a frame from another device. Since the tag information table is shared among all the transport layer processing elements, all ports of a SAS wide port may rapidly verify the validity of tag information received in SAS frames transmitted to the ports of a SAS wide port.

Element 400 of FIG. 4 is first operable to receive a frame from a transmitting device. The received frame includes a received tag value. Element 402 then looks up the received tag value in the tag information table. If a record or row is located in the tag information table corresponding to the received a tag value, the device ID of the associated SAS device is returned from the table record so located. Element 404 then determines whether the received tag value is valid for use with the transmitting device. As noted, the look up procedure of element 402 returns the SAS device ID of the SAS device properly associated with the received packet value (if any). If the device ID in the located table record does not match the transmitting device or if no record is located in the tag information table, then the received tag value is not properly utilized in association with transmissions from the transmitting SAS device. Element 412 then rejects the received a frame sending an appropriate response to the transmitting device indicating that the tag value is invalid.

If element 404 determines that the received tag value is properly utilized by the transmitting device, element 406 is operable to process the valid frame normally within the transport layer processing element. Normal processing of a received frame generally entails, inter alia, forwarding the received frame to an appropriate higher level application or system process for further substantive processing.

As noted above, when the transport layer processing element receive engine is operating as an initiator device receiving information from a previously addressed target device, the receive engine of the transport layer may automatically determine when valid use of a received tag value is properly completed. In such a case, element 408 is operable to determine whether the received a frame is a SAS RESP frame from a SAS target device. If not, processing of this received frame by the receive engine of this transport layer processing element is completed to be restarted upon receipt of a next frame. If element 408 determines that the received frame is an SAS RESP frame, element 410 is then operable to update the tag information table to invalidate the received tag value. In other words, use of the received tag value by the transmitting device is not properly completed in view of receipt of the SAS RESP frame.

Where the receive engine of this transport layer processing element is not operating as an initiator device but rather is operable as a target device, automated detection of completed use of the tag value is somewhat more difficult. Preferably, an external processing element (i.e., higher level SAS protocol processing elements) may determine when the received tag value is no longer valid for use by the transmitting device. The higher level SAS protocol processing element would then update the tag information table appropriately.

FIG. 5 is a flowchart of such a process in a higher level SAS protocol processing element to indicate that a properly received tag value is no longer valid for use by a particular device. Element 500 of FIG. 5 is operable within the higher layer SAS protocol processing element to receive and process a properly received SAS frame already verified by the transport layer processing element as properly utilizing a particular tag value. The processing within this higher layer SAS processing element is any appropriate processing to utilize a correctly received SAS frame. Element 502 then determines whether additional received frames are expected and associated with the same tag value and the same transmitting device. If this presently received frame is not the end of the valid tag value use, processing of this frame within the higher layer processing element is completed. If this received frame represents completion of valid use of the particular tag value in association with a particular SAS device, element 504 is operable to update the tag information table to indicate that the received tag value is no longer valid for use with this particular device.

Those of ordinary skill in the art will recognize a variety of equivalent methods and processes to provide the processing features exemplified by the flowcharts of FIGS. 3 through 5. Such processing may be performed within customized hardware circuits controlling the SAS transport layer processing. Permitting such tag validation to be performed automatically by custom circuits associated with each of a multiple ports comprising a SAS wide port simplifies tag validation processing for a SAS wide port application. Those of ordinary skill in the art will also recognize that though the features and aspects hereof described above may be particularly useful for SAS wide port applications, the same structures and techniques are similarly applicable for a single physical port associated with a single transport layer processing element. The features and aspects hereof allow for simplified integration of tag validation within customized circuits associated with transport layer processing.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A SAS controller adapted for performing SAS protocol transport layer processing, the controller comprising:
    a plurality of transport layer processing elements that comprise a SAS wide port of the SAS controller, each transport layer processing element adapted for performing SAS transport layer processing for a corresponding port of the SAS wide port of the SAS controller;
    a tag information table for storing tag values and associated device identification information; and
    a communication medium coupling all the plurality of transport layer processing elements to the tag information table such that each processing element may share access to the tag information table,
    wherein each transport layer processing element is adapted to validate tag information in frames using the information in the tag information table, and
    wherein each transport layer processing element is further adapted to reject a received frame that includes invalid tag information.

2. The controller of claim 1 wherein each transport layer processing element further comprises:
    a transmit frame engine for managing transmission of frames to other devices; and a receive frame engine for managing reception of frames from other devices.

3. The controller of claim 2 wherein the transmit frame engine is adapted to make a particular tag value valid by storing information in the tag information table indicating the particular tag value is valid for use with a particular device wherein the transmit frame engine is so operable in response to transmission of a frame to the particular device using the particular tag value, and wherein the receive frame engine is adapted to verify validity of a received tag value by looking up the received tag value in the tag information table, wherein the received tag value is provided in a received frame from a transmitting device.

4. The controller of claim 3 wherein the transmit frame engine is further adapted to make the particular tag value valid by storing information in response to transmission of a SAS COMMAND frame transmitted as a SAS initiator device.

5. The controller of claim 3 wherein the transmit frame engine is further adapted to make the particular tag value valid by storing information in response to transmission of a SAS XFER_RDY frame transmitted as a SAS target device.

6. The controller of claim 3 wherein the receive frame engine is adapted to make invalid a particular tag value indicated as valid in the tag information table by updating information in the tag information table.

7. The controller of claim 6 wherein the receive frame engine is further adapted to make the particular tag value invalid in response to receipt of a SAS RESP frame received in any of the plurality of transport layer processing elements operating as a SAS initiator device.

8. The controller of claim 3 further comprising:
an auxiliary processing element external to the transport layer processing elements and associated with the transport layer processing elements and adapted to make a particular tag value invalid.

9. A method operable in a SAS controller having a SAS wide port comprising a plurality of transport layer processing elements, the method comprising:
transmitting a SAS frame with a particular tag value from a transmitting one of the plurality of transport layer processing elements to a particular SAS device;
storing tag validity information in a tag information table shared by all of the plurality of transport layer processing elements, wherein the tag validity information indicates that the particular tag value is valid for frames associated with the particular SAS device;
validating the received tag value associated with any frames received in any of the plurality of transport layer processing elements by looking up the received tag value in the tag information table to determine whether the received tag value is valid; and
rejecting a received frame that includes invalid tag information.

10. The method of claim 9 wherein the step of transmitting further comprises:
transmitting a SAS COMMAND frame as an initiator SAS device.

11. The method of claim 9 wherein the step of transmitting further comprises:
transmitting a SAS $XFER_{13}$ RDY frame as a target SAS device.

12. The method of claim 9 further comprising:
updating the tag information table to indicate that a particular tag value previously indicated as valid is now invalid.

13. The method of claim 12 wherein the step of updating further comprises:
updating the tag information table in response to receipt of a SAS RESP frame in any of the plurality of transport layer processing element operating as a SAS initiator device.

14. The method of claim 12 wherein the step of updating further comprises:
updating the tag information table from a processor external to all of the plurality of transport layer processing elements in response to a determination that the particular tag value is no longer valid for the particular device.

* * * * *